United States Patent
Silverstein et al.

(10) Patent No.: US 11,132,352 B1
(45) Date of Patent: Sep. 28, 2021

(54) UTILIZING LOCAL IOT DEVICES TO RECONCILE DATA MISMATCHES

(71) Applicant: International Business Machines Corporation, Armonk, NY (US)

(72) Inventors: Zachary A. Silverstein, Jacksonville, FL (US); Jacob Ryan Jepperson, Austin, TX (US); Craig M. Trim, Ventura, CA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/931,501

(22) Filed: May 13, 2020

(51) Int. Cl.
*G06F 16/23* (2019.01)
*H04L 12/24* (2006.01)
*H04L 29/06* (2006.01)
*H04L 29/08* (2006.01)
*G16Y 10/75* (2020.01)

(52) U.S. Cl.
CPC ...... *G06F 16/2365* (2019.01); *H04L 41/0654* (2013.01); *H04L 67/12* (2013.01); *H04L 69/22* (2013.01); *G16Y 10/75* (2020.01)

(58) Field of Classification Search
CPC ............. H04L 41/00; H04L 41/04–046; H04L 41/06; H04L 41/0654; H04L 41/0672; H04L 41/0681; H04L 41/08–0886; H04L 41/0893; H04L 41/12; H04L 41/142; H04L 41/145; H04L 41/22; H04L 41/42
See application file for complete search history.

(56) References Cited

U.S. PATENT DOCUMENTS

| | | | |
|---|---|---|---|
| 7,543,047 B2 | 6/2009 | Park | |
| 9,432,455 B2 | 8/2016 | Jeide | |
| 9,984,773 B2 | 5/2018 | Gondhalekar | |
| 2007/0276836 A1* | 11/2007 | Chatterjee | G06F 16/182 |
| 2016/0337169 A1* | 11/2016 | Chhabra | H04L 41/0672 |
| 2016/0366221 A1 | 12/2016 | Palmeri | |
| 2017/0027008 A1* | 1/2017 | Krishnamoorthy | H04L 67/1072 |
| 2017/0141968 A1* | 5/2017 | Lloyd | H04L 41/0886 |
| 2017/0331670 A1* | 11/2017 | Parkvall | H04L 41/0233 |
| 2018/0097690 A1* | 4/2018 | Yocam | H04W 4/70 |
| 2018/0295016 A1* | 10/2018 | Frahim | H04L 67/34 |

(Continued)

OTHER PUBLICATIONS

Definition of WI-FI by Wikipedia (Year: 2020).*

(Continued)

*Primary Examiner* — Boris D Grijalva Lobos
(74) *Attorney, Agent, or Firm* — Edward Li (57) ABSTRACT

A computer-implemented method, a computer program product, and a computer system for utilizing local IoT devices to reconcile data mismatch. A first IoT device in a group of IoT devices determines whether all of the IoT devices have received the update impulse from a server, in response to receiving an update impulse from the server. The first IoT device retrieves data since a last checksum shared by the first IoT device and a second IoT device, in response to determining that the second IoT device in the group has not received the update impulse from the server. The first IoT device packages the data since the last checksum into a payload and sends, through a reconciliation channel of the group, the payload to the second IoT device. The second IoT device reconciles a data mismatch, based on the payload.

17 Claims, 5 Drawing Sheets

(56) References Cited

U.S. PATENT DOCUMENTS

| | | | |
|---|---|---|---|
| 2018/0365616 A1 | 12/2018 | Taylor | |
| 2019/0250898 A1* | 8/2019 | Yang | H04L 67/36 |
| 2020/0021485 A1* | 1/2020 | Pillai | H04L 9/3271 |
| 2021/0019133 A1* | 1/2021 | Rusev | H04L 67/34 |

OTHER PUBLICATIONS

"Data Reconciliation on Demand", An IP.com Prior Art Database Technical Disclosure, Disclosed Anonymously, IP.com No. IPCOM000240630D, IP.com Electronic Publication Date: Feb. 13, 2015, 7 pages.

"IOT Data Management: Manage the edge at scale", CouchBase|No EQUAL, last printed May 13, 2020, 2 pages.

"System and Method to Dynamically Assess Performance and Functions of IoT Devices After Updates", An IP.com Prior Art Database Technical Disclosure, Disclosed Anonymously, IP.com No. IPCOM000259152D, IP.com Electronic Publication Date: Jul. 16, 2019, 4 pages.

"The Internet of Things delivers the data. AI powers the insights.", ibm.com, last printed May 13, 2020, 5 pages, <https://www.ibm.com/internet-of-things>.

Bort, Julie, "Here's who's getting rich now that Slack is a public company worth over $20 billion", businessinsider.com, Jun. 20, 2019, 6 pages, <https://www.businessinsider.com/insiders-employees-getting-rich-on-slack-ipo-2019-4>.

Bridget, Michelle, "How to Slack smarter?—a UX case study", UX Collective, Sep. 15, 2018, 12 pages, <https://uxdesign.cc/how-to-slack-better-3779daf576ae>.

Columbus, Louis, "IoT Market Predicted to Double by 2021, Reaching $520B", Forbes.com, Aug. 16, 2018, 5 pages, <https://www.forbes.com/sites/louiscolumbus/2018/08/16/iot-market-predicted-to-double-by-2021-reaching-520b/#7bdf02791f94>.

Go, et al,. "Reliable, Consistent, and Efficient Data Sync for Mobile Apps", Proceedings of the 13th USENIX Conference on File and Storage Technologies (FAST '15), Feb. 16-19, 2015, pp. 359-372, <https://www.usenix.org/conference/fast15/technical-sessions/presentation/go>.

Mell et al., "The NIST Definition of Cloud Computing", National Institute of Standards and Technology, Special Publication 800-145, Sep. 2011, 7 pages.

Niazi, et al., "Architecture to Devise a Manufacturer Usage Description Based Cloud Services Exchange for Internet of Things Devices", Copyright 2016 Cisco Systems, Inc., An IP.com Prior Art Database Technical Disclosure, IP.com No. IPCOM000248696D, IP.com Electronic Publication Date: Dec. 27, 2016, 9 pages.

Saminah, "A User Research Case Study on Slack: Phase 2, Usability Studies", medium.com, Apr 3, 2015, 11 pages, <https://medium.com/@samihah/a-user-research-case-study-on-slack-phase-2-usability-studies-41226485447c>.

Song, et al., "Scalable String Reconciliation by Recursive Content-Dependent Shingling", 2019 57th Annual Allerton Conference on Communication, Control, and Computing, pp. 623-630.

Zivkovic, Mile, "Slack vs Microsoft Teams: Which Tool Is Ahead of the Game?", Chanty, Dec. 13, 2019, 22 pages, <https://www.chanty.com/blog/slack-vs-microsoft-teams/>.

\* cited by examiner

UTILIZING LOCAL IOT DEVICES TO RECONCILE DATA MISMATCHES

BACKGROUND

The present invention relates generally to reconciliation of data mismatches, and more particularly to utilizing local IoT devices to reconcile data mismatches.

As an increasing number of IoT and connected devices are in use by individuals, it becomes more likely that a user experiences mismatches in data and notifications. For instance, both a laptop and a cellphone of a user may be enabled to show push notifications, and both the devices may subscribe to the same hook for updates. In this case, the user gets a piece of information or data on one and however the other comes many minutes later. Inconsistent data between devices is a big problem in failure situations.

SUMMARY

In one aspect, a computer-implemented method for utilizing local IoT devices to reconcile data mismatches is provided. The computer-implemented method includes determining, by a first IoT device in a group of IoT devices, whether all of the IoT devices have received the update impulse from a server, in response to receiving the update impulse from the server. The computer-implemented method further includes retrieving, by the first IoT device, data since a last checksum shared by the first IoT device and a second IoT device, in response to determining that the second IoT device in the group has not received the update impulse from the server. The computer-implemented method further includes packaging, by the first IoT device, the data since the last checksum into a payload. The computer-implemented method further includes sending, by the first IoT devices, the payload to the second IoT device, through a reconciliation channel of the group. In the computer-implemented method, the second IoT device reconciles a data mismatch, based on the payload.

In another aspect, a computer program product for utilizing local IoT devices to reconcile data mismatches is provided. The computer program product comprises a computer readable storage medium having program instructions embodied therewith, and the program instructions are executable by one or more processors. The program instructions are executable to determine, by a first IoT device in a group of IoT devices, whether all of the IoT devices have received the update impulse from a server, in response to receiving an update impulse from the server; retrieve, by the first IoT device, data since a last checksum shared by the first IoT device and a second IoT device, in response to determining that the second IoT device in the group has not received the update impulse from the server; package, by the first IoT device, the data since the last checksum into a payload; send, by the first IoT devices, the payload to the second IoT device, through a reconciliation channel of the group; wherein the second IoT device reconciles a data mismatch, based on the payload.

In yet another aspect, a computer system for utilizing local IoT devices to reconcile data mismatches is provided. The computer system comprises one or more processors, one or more computer readable tangible storage devices, and program instructions stored on at least one of the one or more computer readable tangible storage devices for execution by at least one of the one or more processors. The program instructions are executable to determine, by a first IoT device in a group of IoT devices, whether all of the IoT devices have received the update impulse from a server, in response to receiving an update impulse from the server. The program instructions are further executable to retrieve, by the first IoT device, data since a last checksum shared by the first IoT device and a second IoT device, in response to determining that the second IoT device in the group has not received the update impulse from the server. The program instructions are further executable to package, by the first IoT device, the data since the last checksum into a payload. The program instructions are further executable to send, by the first IoT devices, the payload to the second IoT device, through a reconciliation channel of the group. In the computer system, the second IoT device reconciles a data mismatch, based on the payload.

DETAILED DESCRIPTION

Embodiments of the present invention provide a solution to a problem: how to reconcile push notifications under a condition when multiple devices within a physical proximity are listening to a same stream and have different data received at different times. The condition causes sync mismatches and poor data integrity. For example, a user receives a Slack message on a laptop of the user, but user cannot receive the message on a mobile phone.

Embodiments of the present invention propose a solution to reconciling data mismatches. In embodiments of the present invention, reconciling data mismatches enables data and analytic errors to be fixed at the source rather than downstream. Fixing data and analytic errors at downstream is more costly and time-consuming.

In embodiments of the present invention, a proposed system utilizes IoT devices to capture current states, iterative changes, and iterative package changes in small payloads, and furthermore the proposed system locally transfers the above-mentioned information from device to device via a priority channel. Once the above-mentioned information is locally transferred, device states are updated, responses are returned through an IoT network to validate that transactional requests have been satisfied and all IoT devices are current and matched.

Figure 1:
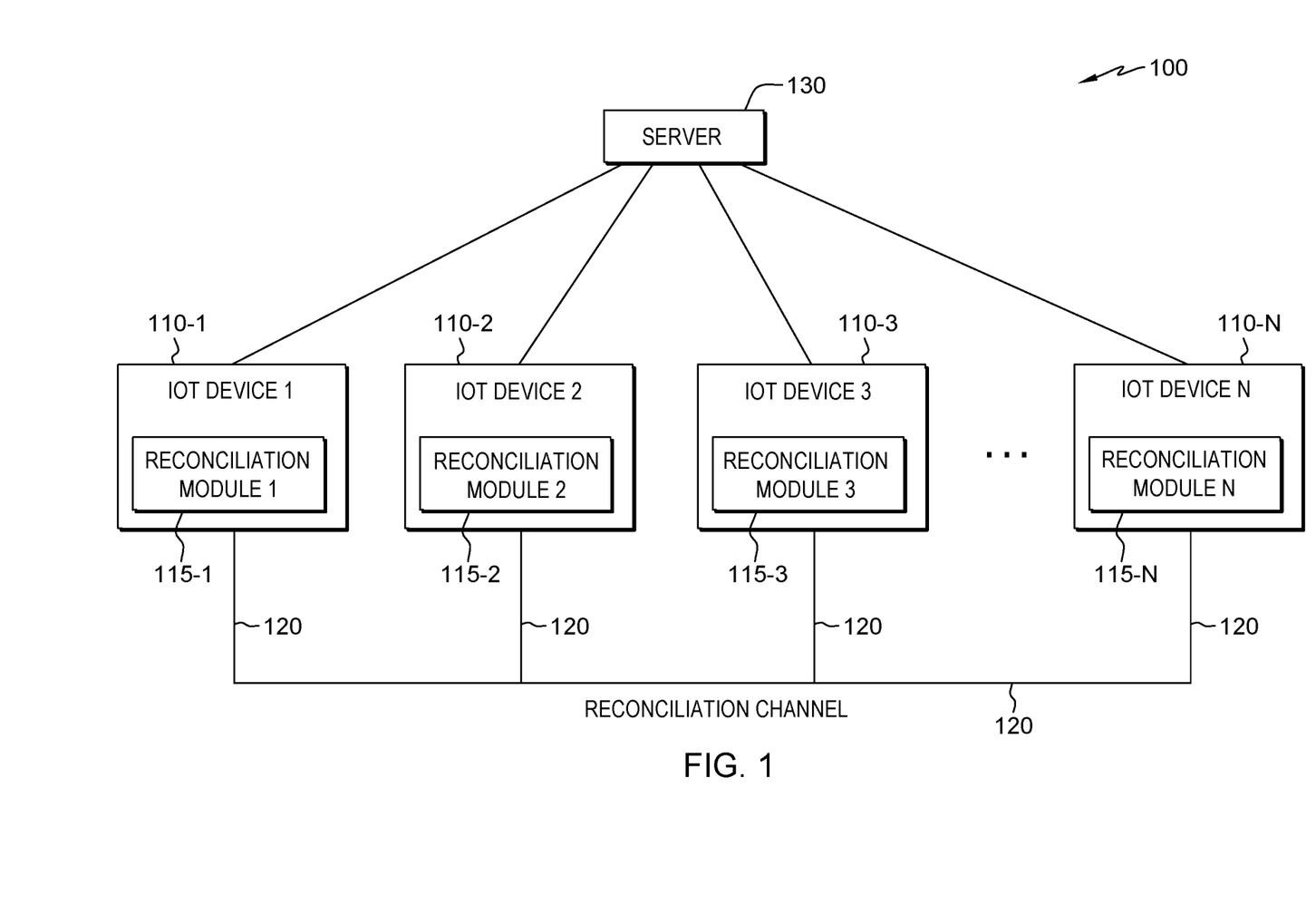
FIG. 1 is a diagram illustrating a system for utilizing local IoT devices to reconcile data mismatch, in accordance with one embodiment of the present invention.

FIG. 1 is a diagram illustrating system 100 for utilizing local IoT devices to reconcile data mismatch, in accordance with one embodiment of the present invention. System 100 comprises N IoT devices, namely IoT device 1 110-1, IoT device 2 110-2, IoT device 3 110-3, . . . , and IoT device N 110-N. Each of the IoT devices includes a reconciliation module. IoT device 1 110-1 includes reconciliation module 1 115-1, IoT device 2 110-2 includes reconciliation module 2 115-2, IoT device 3 110-3 includes reconciliation module 3 115-3, . . . , and IoT device N 110-N includes reconciliation module N 115-N. All the reconciliation module on the IoT devices shown in FIG. 1 communicate to each other through reconciliation channel 120 which is a local communication channel. For example, reconciliation channel 120 may be LAN, BLUETOOTH®, ZIGBEE®, or WI-FI®. The local communication methodology places IoT devices on a same local network. Each IoT device recognizes affiliated devices in the same local network via reconciliation module association. One or more users of the IoT devices sign up or opt in system 100 for utilizing local IoT devices to reconcile data mismatch; therefore, the IoT devices are capable of communicating with each other through reconciliation channel 120. Each of the reconciliation modules has an open port for validation through reconciliation channel 120. Open ports of respective ones of the reconciliation modules validate current data status and the timestamp of the last update impulse. Machine-to-machine (M2M) communication between the IoT devices ensures connectivity on the reconciliation channel.

System 100 further comprises server 130. Server 130 is situated on a computer system. The computer system is described in more detail in later paragraphs with reference to FIG. 3. In another embodiment, server 130 may be implemented on a virtual machine or another virtualization implementation being run on a computer device. In yet another embodiment, server 130 may be implemented in a cloud computing environment. The cloud computing environment is described in later paragraphs with reference to FIG. 4 and FIG. 5.

Each of the IoT devices receives data feeds (or update impulses) from server 130 via webhook or timer refresh. For example, the connection between the IoT devices and the server uses cellular or WIFI® connectivity. The IoT devices record checksums of the most recent update impulse received from the server. For example, the update impulse is an event queue such as a message or a notification.

Figure 2:
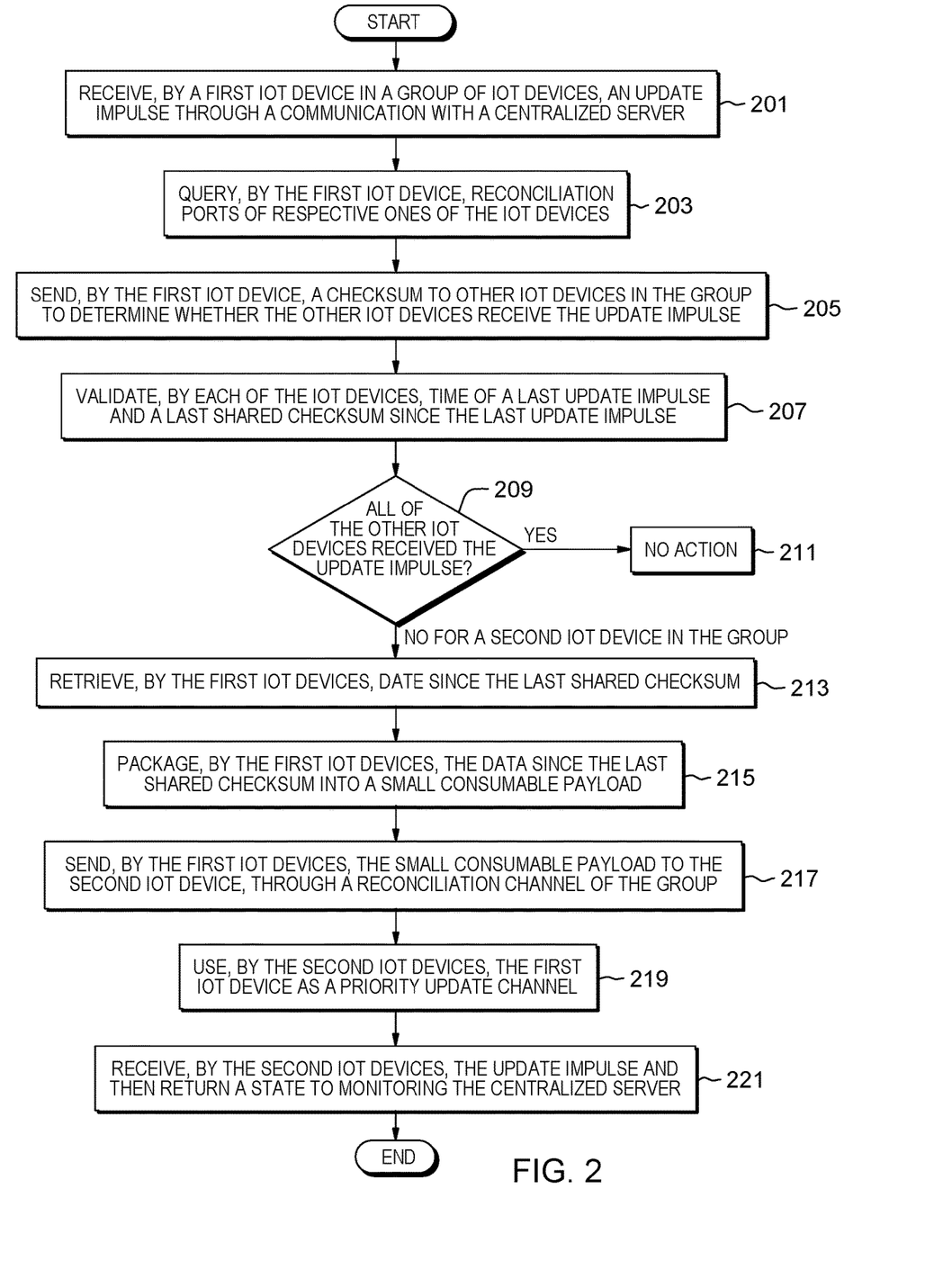
FIG. 2 presents a flowchart showing operational steps of utilizing local IoT devices to reconcile data mismatch, in accordance with one embodiment of the present invention.

FIG. 2 presents a flowchart showing operational steps of utilizing local IoT devices to reconcile data mismatch, in accordance with one embodiment of the present invention. At step 201, a first IoT device in a group of IoT devices receives an update impulse (or a new data stream) through a communication with a centralized server. In the embodiment shown in FIG. 1, one of IoT devices (IoT device 1 110-1, IoT device 2 110-2, IoT device 3 110-3, . . . , and IoT device N 110-N), for example IoT device 1 110-1 as the first IoT device, receives the update impulse through the communication with server 130. The one of the IoT devices receives the update impulse from server 130 via webhook or timer refresh, using cellular or Wi-Fi connectivity to server 130.

At step 203, the first IoT device queries reconciliation ports of respective ones of the IoT device, after receiving the update impulse through wireless communications with the centralized server. Querying the reconciliation ports is through a local network—a conciliation channel. In the embodiment shown in FIG. 1, the one of the IoT devices (e.g., IoT device 1 110-1 as the first IoT device) queries reconciliation ports of the respective ones of the IoT devices (e.g., IoT device 2 110-2, IoT device 3 110-3, . . . , and IoT device N 110-N), through conciliation channel 120.

At step 205, the first IoT device sends a checksum of the update impulse to other IoT devices in the group to determine whether the other IoT devices receive the update impulse from the centralized server. In the embodiment shown in FIG. 1, for example, IoT device 1 110-1 is the first IoT device and sends the checksum of the update impulse to each of IoT device 2 110-2, IoT device 3 110-3, . . . , and IoT device N 110-N, in order to determine whether IoT device 2 110-2, IoT device 3 110-3, . . . , and IoT device N 110-N have received the update impulse.

At step 207, the IoT devices in the group validate time of a last update impulse and a last shared checksum since the last update impulse. In the embodiment shown in FIG. 1, for example, IoT device 1 110-1, IoT device 2 110-2, IoT device 3 110-3, . . . , and IoT device N 110-N validate time of the last update impulse and the last shared checksum since the last update impulse.

At step 209, the first IoT device determines whether all other IoT devices receives the update impulse from the centralized server. In the embodiment shown in FIG. 1, for example, IoT device 1 110-1 is the first IoT device and determines whether each of IoT device 2 110-2, IoT device 3 110-3, . . . , and IoT device N 110-N have received the update impulse.

In response to determining all the other IoT devices have received the update impulse from the centralized server (YES branch of step 209), no action will be taken (as shown in block 211). In response to determining that a second IoT device in the group has not received the update impulse from the centralized server (NO branch of step 207), the first IoT device at step 213 retrieves data that is received by the first IoT device since the last shared checksum. In the embodiment shown in FIG. 1, for example, IoT device 1 110-1 is the first IoT device and determines that one of IoT device 2 110-2, IoT device 3 110-3, . . . , and IoT device N 110-N has not received the update impulse from the centralized server; therefore, IoT device 1 110-1 retrieves the data that is received by IoT device 1 110-1 since the last shared checksum.

At step 215, the first IoT device packages the data (which is retrieved at step 213) into a small consumable payload. At step 217, the first IoT device sends the small consumable payload to the second IoT device, through a reconciliation channel of the group. In the embodiment shown in FIG. 1, for example, IoT device 1 110-1 is the first IoT device and IoT device 2 110-2 is the second IoT device, IoT device 1 110-1 sends the small consumable payload to IoT device 2 110-2 through reconciliation channel 120.

At step 219, the second IoT device uses the first IoT device as a priority update channel. The second IoT device overwrites any ongoing fetch that may have issues due to network connectivity or a software error as a priority data update channel. At step 220, the second IoT device receives the update impulse from the first IoT device through the reconciliation channel, and then returns a state to monitoring the centralized server. The second IoT device receives from the first IoT device the update impulse, overwrites any ongoing or stuck threads on the second IoT device, and updates to a new normal since the last shared checksum.

A first use case is as follows. A user has SLACK® on a cellphone, a smartwatch, and a laptop. The devices has opted in a system using the reconciliation channel, and each of the devices has the reconciliation module. Local SLACK® application on each of the devices uses cellular or WI-FT® connectivity to attach to a SLACK® cloud module via webhook or timer refresh. Each device is in a same BLUETOOTH® LAN. Each update impulse is an event queue such as message or notification. The user gets an update impulse on the cellphone and the laptop but not on the smartwatch. Each of the devices validates the most recent checksum via BLUETOOTH® and discover that the smartwatch is having issues and does not have the most recent checksum. One of the devices (the cellphone or the laptop) with a most recent checksum finds the last shared checksum and state that has been shared between all devices on the network, and packages up all data received since the most recent checksum. The cellphone or the laptop sends this packaged data via the reconciliation channel, and the smartwatch takes the packaged data as an update and reconciles based on the packaged data. This transfer and update to the smartwatch is recorded to ensure the repository of most recent checksums across the devices is current, accurate, and prepared for the next update impulse.

A second use case is as follows. A user has a cellphone and a laptop receiving an email message. The cellphone receives the email message instantly, while the laptop delays by 2 minutes in receiving the email message. Both the cellphone and the laptop vertically synchronize to a same cloud message server but an application on the laptop takes longer to receive for a number of reasons. As soon as the cellphone gets the email message, it laterally (via Bluetooth for instance) queries the laptop and checks whether the laptop has received the email message. If the laptop has received the email message, the cellphone passes the email message and a payload to the laptop for instant ingestion and interaction; thus, the laptop does not need to wait for 2 minutes. The cellphone becomes an ad-hoc data source for the laptop.

A third use case is as follows. A team needs to support applications that are in high demand and are tied to real time dynamic notifications. Those notifications need to arrive seamlessly and consistently across all team members that are working together to ensure consistency in all communications. This needs to include all devices for all the users working on the support team. Thus, it's imperative that all communications are synchronized to all technical devices of the support team. For the devices, checksums can be coordinated across all devices. The checksums for all devices can be coordinated within a cloud based offering and pushed simultaneously for recipe delivery with confirmation. Users are able to join and leave a team-based reconciliation module on demand, based on their job role and shift availability.

Figure 3:
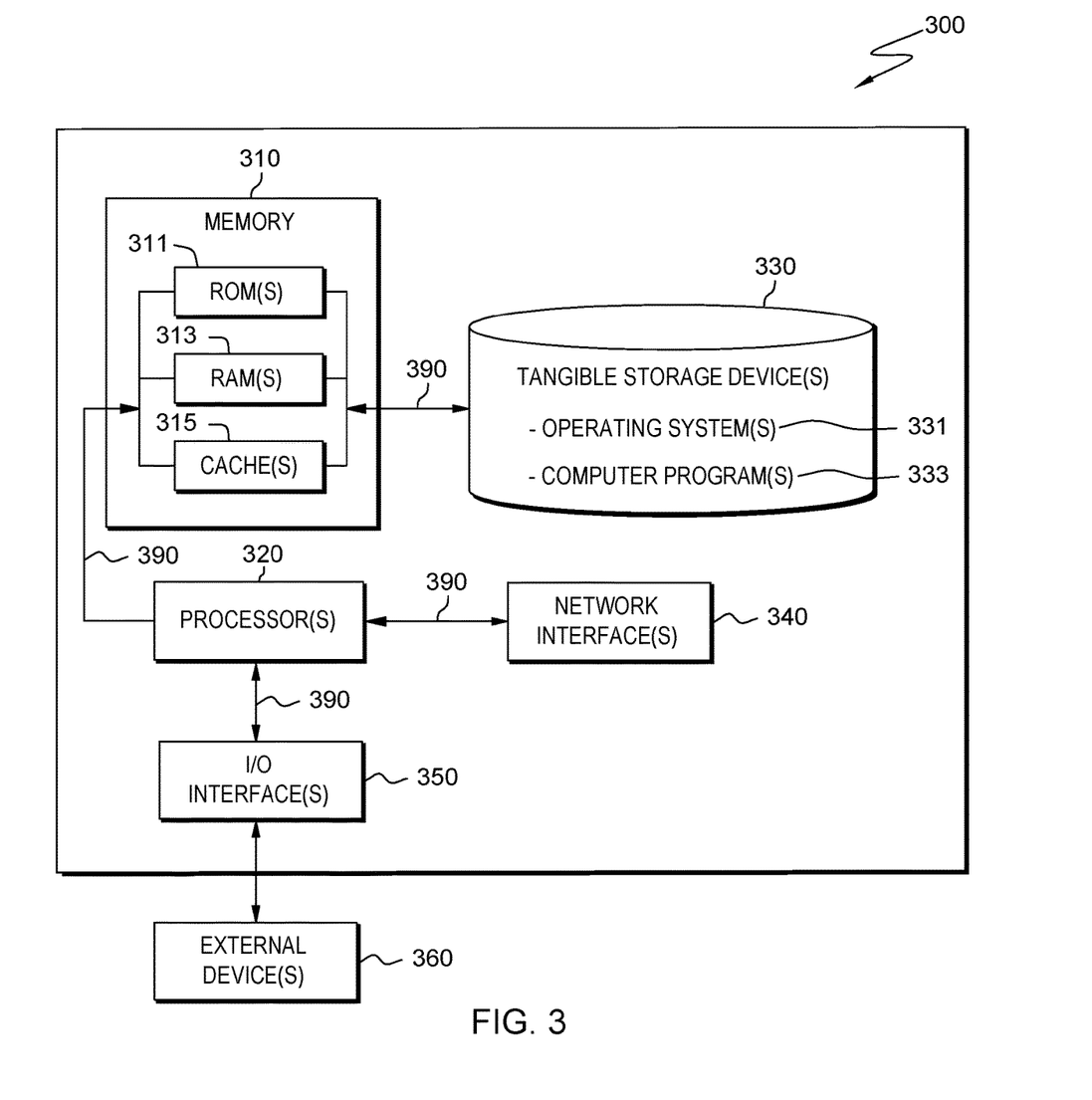
FIG. 3 is a diagram illustrating components of a computer system, in accordance with one embodiment of the present invention.

FIG. 3 is a diagram illustrating components of a computing system, in accordance with one embodiment of the present invention. It should be appreciated that FIG. 3 provides only an illustration of one implementation and does not imply any limitations with regard to the environment in which different embodiments may be implemented.

Referring to FIG. 3, computer system 300 includes processor(s) 320, memory 310, and tangible storage device(s) 330. In FIG. 3, communications among the above-mentioned components of computer system 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computer system 300 further includes I/O interface(s) 350. I/O interface(s) 350 allows for input and output of data with external device(s) 360 that may be connected to computer system 300. Computer system 300 further includes network interface(s) 340 for communications between computer system 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as SMALLTALK™, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
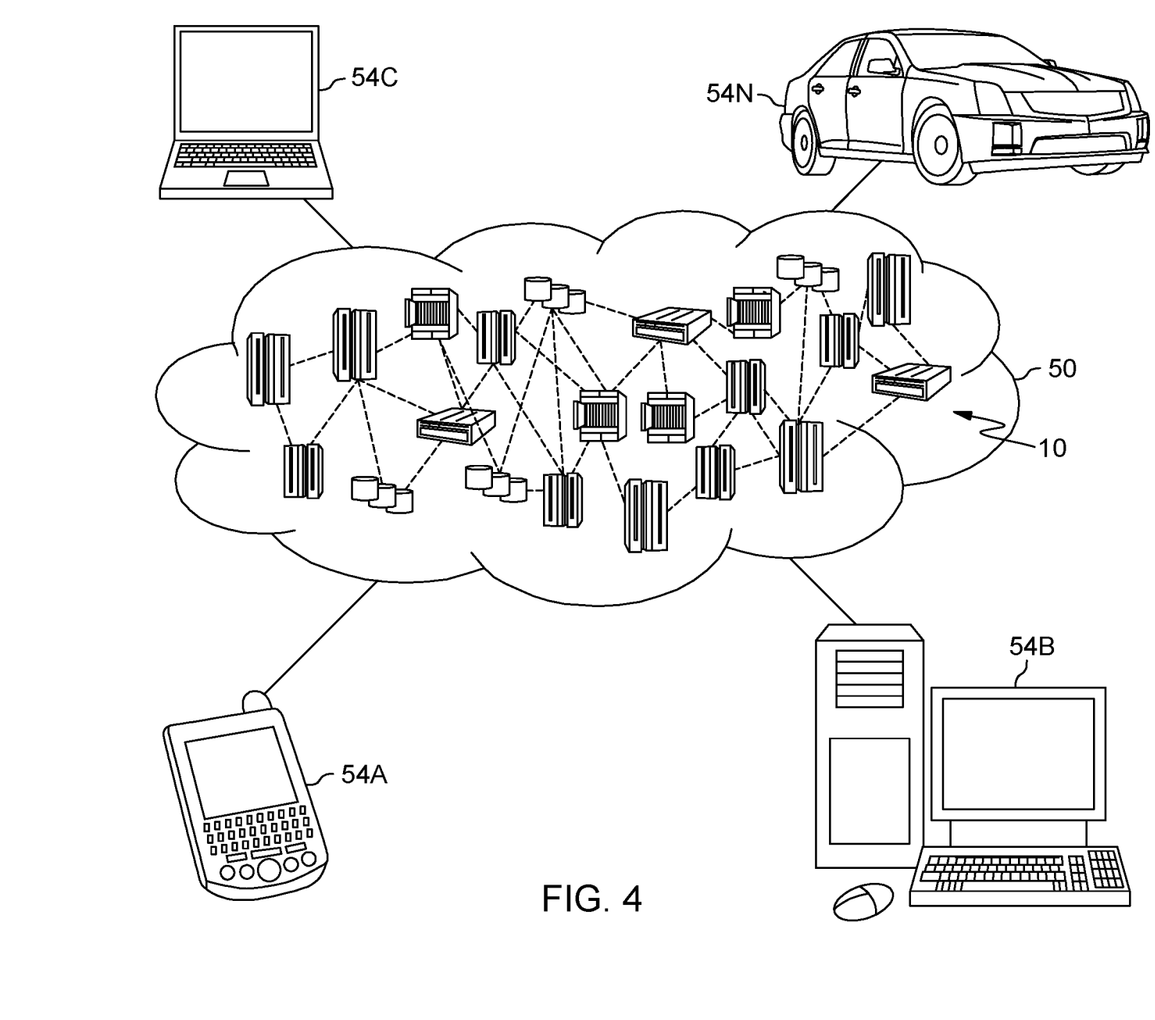
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
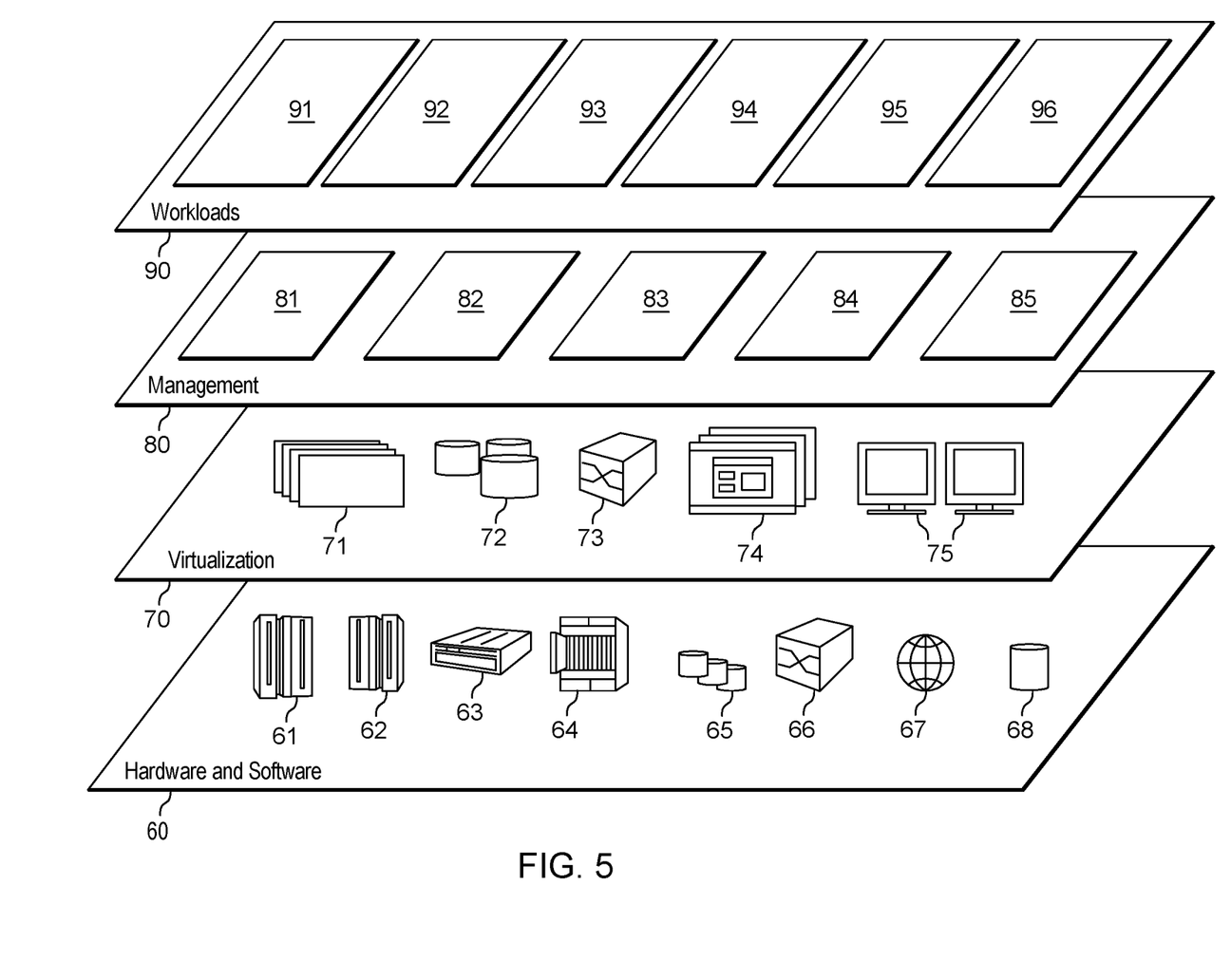
FIG. 5 depicts abstraction model layers in a cloud computing environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of server 130 shown in FIG. 1.

What is claimed is:

1. A computer-implemented method for utilizing local Internet of Things (IoT) devices to reconcile data mismatches, the method comprising:
   in response to receiving an update impulse from a server, determining, by a first IoT device in a group of IoT devices, whether all of the IoT devices in the group of IoT devices have received the update impulse from the server;
   in response to determining that a second IoT device in the group has not received the update impulse from the server, retrieving, by the first IoT device, data since a last checksum shared by the first IoT device and the second IoT device;
   packaging, by the first IoT device, the data since the last checksum into a payload;
   sending, by the first IoT devices, the payload to the second IoT device, through a reconciliation channel of the group;
   overwriting, by the second IoT device, an ongoing fetch of the update impulse from the server; and
   wherein the second IoT device reconciles a data mismatch, based on the payload.

2. The computer-implemented method of claim 1, further comprising:
   using, by the second IoT device, the first IoT device as a priority update channel;
   receiving, by the second IoT device, the update impulse from the first IoT device, through the reconciliation channel; and
   in response to receiving the update impulse from the first IoT device, returning, by the second IoT device, a state to monitoring the server.

3. The computer-implemented method of claim 1, further comprising:
   querying, by the first IoT device, reconciliation ports of respective ones of the IoT devices in the group, through the reconciliation channel; and
   sending, by the first IoT device, a checksum of the update impulse to other devices in the group, through the reconciliation channel.

4. The computer-implemented method of claim 3, further comprising:
  validating, by each of the IoT devices in the group, time of a last update impulse and the last checksum since the last update impulse.

5. The computer-implemented method of claim 1, wherein the group of the IoT devices are on a same local network and communicate to each other through the reconciliation channel, wherein the IoT devices recognize each other in the same local network via reconciliation module association.

6. The computer-implemented method of claim 1, wherein respective ones of the IoT devices receive data feeds from the server, wherein the respective ones of the IoT devices record checksums of the data feeds.

7. A computer program product for utilizing local Internet of Things (IoT) devices to reconcile data mismatches, the computer program product comprising a computer readable storage medium having program instructions embodied therewith, the program instructions executable by one or more processors, the program instructions executable to:
  in response to receiving an update impulse from a server, determine, by a first IoT device in a group of IoT devices, whether all of the IoT devices in the group of IoT devices have received the update impulse from the server;
  in response to determining that a second IoT device in the group has not received the update impulse from the server, retrieve, by the first IoT device, data since a last checksum shared by the first IoT device and the second IoT device;
  package, by the first IoT device, the data since the last checksum into a payload;
  send, by the first IoT devices, the payload to the second IoT device, through a reconciliation channel of the group;
  overwrite, by the second IoT device, an ongoing fetch of the update impulse from the server; and
  wherein the second IoT device reconciles a data mismatch, based on the payload.

8. The computer program product of claim 7, further comprising the program instructions executable to:
  use, by the second IoT device, the first IoT device as a priority update channel;
  receive, by the second IoT device, the update impulse from the first IoT device, through the reconciliation channel; and
  in response to receiving the update impulse from the first IoT device, return, by the second IoT device, a state to monitoring the server.

9. The computer program product of claim 7, further comprising the program instructions executable to:
  query, by the first IoT device, reconciliation ports of respective ones of the IoT devices in the group, through the reconciliation channel; and
  send, by the first IoT device, a checksum of the update impulse to other devices in the group, through the reconciliation channel.

10. The computer program product of claim 9, further comprising the program instructions executable to:
  validate, by each of the IoT devices in the group, time of a last update impulse and the last checksum since the last update impulse.

11. The computer program product of claim 7, wherein the group of the IoT devices are on a same local network and communicate to each other through the reconciliation channel, wherein the IoT devices recognize each other in the same local network via reconciliation module association.

12. The computer program product of claim 7, wherein respective ones of the IoT devices receive data feeds from the server, wherein the respective ones of the IoT devices record checksums of the data feeds.

13. A computer system for utilizing local Internet of Things (IoT) devices to reconcile data mismatches, the computer system comprising:
  one or more processors, one or more computer readable tangible storage devices, and program instructions stored on at least one of the one or more computer readable tangible storage devices for execution by at least one of the one or more processors, the program instructions executable to:
  in response to receiving an update impulse from a server, determine, by a first IoT device in a group of IoT devices, whether all of the IoT devices in the group of IoT devices have received the update impulse from the server;
  in response to determining that a second IoT device in the group has not received the update impulse from the server, retrieve, by the first IoT device, data since a last checksum shared by the first IoT device and the second IoT device;
  package, by the first IoT device, the data since the last checksum into a payload;
  send, by the first IoT devices, the payload to the second IoT device, through a reconciliation channel of the group;
  overwrite, by the second IoT device, an ongoing fetch of the update impulse from the server; and
  wherein the second IoT device reconciles a data mismatch, based on the payload.

14. The computer system of claim 13, further comprising the program instructions executable to:
  use, by the second IoT device, the first IoT device as a priority update channel;
  receive, by the second IoT device, the update impulse from the first IoT device, through the reconciliation channel; and
  in response to receiving the update impulse from the first IoT device, return, by the second IoT device, a state to monitoring the server.

15. The computer system of claim 13, further comprising the program instructions executable to:
  query, by the first IoT device, reconciliation ports of respective ones of the IoT devices in the group, through the reconciliation channel; and
  send, by the first IoT device, a checksum of the update impulse to other devices in the group, through the reconciliation channel.

16. The computer system of claim 15, further comprising the program instructions executable to:
  validate, by each of the IoT devices in the group, time of a last update impulse and the last checksum since the last update impulse.

17. The computer system of claim 13, wherein the group of the IoT devices are on a same local network and communicate to each other through the reconciliation channel, wherein the IoT devices recognize each other in the same local network via reconciliation module association, wherein respective ones of the IoT devices receive data feeds from the server, wherein the respective ones of the IoT devices record checksums of the data feeds.

* * * * *